United States Patent [19]

Lucas

[11] Patent Number: 5,053,859
[45] Date of Patent: Oct. 1, 1991

[54] HIGH DEFINITION B-MAC TELEVISION SIGNAL TRANSMISSION SYSTEM

[75] Inventor: Keith Lucas, Oak Ridges, Canada

[73] Assignee: Scientific-Atlanta, Inc., Atlanta, Ga.

[21] Appl. No.: 255,317

[22] Filed: Oct. 11, 1988

Related U.S. Application Data

[63] Continuation-in-part of Ser. No. 92,305, Sep. 2, 1987, Pat. No. 4,866,519, and a continuation-in-part of Ser. No. 228,274, Aug. 4, 1988.

[51] Int. Cl.$^5$ .................. H04N 7/12; H04N 11/02; H04N 11/10
[52] U.S. Cl. .................................. 358/12; 358/138; 358/13
[58] Field of Search ........................ 358/13, 12, 138

[56] References Cited

U.S. PATENT DOCUMENTS

| | | | |
|---|---|---|---|
| 4,212,028 | 7/1980 | Drewery | 358/13 |
| 4,286,291 | 8/1981 | Taylor et al. | 358/138 |
| 4,291,331 | 9/1981 | Devereux | 358/13 |
| 4,292,652 | 9/1981 | Yumde et al. | 358/138 |
| 4,322,739 | 3/1982 | Drewery et al. | 358/13 |
| 4,323,916 | 4/1982 | Dischert et al. | 358/13 |
| 4,364,090 | 12/1982 | Wendland | 358/140 |
| 4,449,143 | 5/1984 | Dischert et al. | 358/11 |
| 4,531,151 | 7/1985 | Hentschke | 358/135 |
| 4,543,598 | 9/1985 | Oliphant | 358/11 |
| 4,551,753 | 11/1985 | Nishizawa et al. | 358/140 |
| 4,558,362 | 12/1985 | Sugiyama | 358/138 |
| 4,603,350 | 7/1986 | Arbeiter et al. | 358/140 |
| 4,608,600 | 8/1986 | Sugiyama | 358/138 |
| 4,621,286 | 11/1986 | Reitmeier et al. | 358/12 |
| 4,621,287 | 11/1986 | Reitmeier et al. | 358/141 |
| 4,622,577 | 11/1986 | Reitmeier et al. | 358/11 |
| 4,651,208 | 3/1987 | Rhodes et al. | 358/140 |
| 4,661,850 | 4/1987 | Strolle et al. | 358/140 |
| 4,665,427 | 5/1987 | Beckley et al. | 358/11 |
| 4,665,436 | 5/1987 | Osborne et al. | 358/136 |
| 4,672,424 | 6/1989 | Lechner | 358/11 |
| 4,713,688 | 12/1987 | Guttner | 358/141 |
| 4,831,467 | 5/1989 | Farodja | 358/31 |

FOREIGN PATENT DOCUMENTS

| | | |
|---|---|---|
| 0026395 | 9/1980 | European Pat. Off. |
| 0176674 | 10/1985 | European Pat. Off. |
| 102180 | 8/1981 | Japan .................. 358/13 |
| 212282 | 12/1983 | Japan .................. 358/13 |
| 182686 | 10/1984 | Japan .................. 358/138 |
| 60-134692 | 7/1985 | Japan . |
| 62-274994 | 11/1987 | Japan . |
| WO83/02704 | 8/1983 | PCT Int'l Appl. |
| WO88/01462 | 2/1988 | PCT Int'l Appl. |
| 2126822 | 3/1984 | United Kingdom ........ 358/12 |

OTHER PUBLICATIONS

Reitmeier "Spatial-Temporal Frequency Interleaved Processing of A Television Signal", SN615,092 filed 29 May 1984.

(List continued on next page.)

Primary Examiner—John W. Shepperd
Attorney, Agent, or Firm—Banner, Birch, McKie & Beckett

[57] ABSTRACT

A method for encoding a high definition television signal comprising a first frequency spectrum portion for standard resolution and a second high frequency spectrum portion for high resolution consistent with the B-MAC composite signal format comprises the steps or orthogonally sampling the high definition signal, diagonally filtering diagonal resolution information, and decimating alternate samples of alternate lines for folding in high frequency horizontal resolution information by means of a skew-symmetric low-pass filter. A method at a standard television resolution receiver for decoding the high-definition television signal uses a simple low pass filter to recover the baseband television spectrum at standard television resolution. A method at a high-definition television receiver comprises the steps of unfolding the high frequency horizontal resolution information and thereafter line doubling the unfolded high frequency resolution informtion to improve vertical resolution of the high-definition television signal. Thus, the encoding method is compatible for reception at either a standard resolution or high-definition television receiver.

22 Claims, 11 Drawing Sheets

OTHER PUBLICATIONS

Goldberg, Extending PCM Video Response Above The Nyquist Limit, Conference International Broadcasting Convention, London England 20-24 Sep. 1976, pp. 89-91.

"A DBTV System for Optimum Bandwidth Efficiency", W. H. Dobbie, British Telecom Research Laboratories, IEEE, Feb. 1987, pp. 58-63.

"Digital Sub-Nyquist Filters", J. H. Taylor, 1979, pp. 21-26.

"An Introduction to Sub-Nyquist Sampling", K. H. Barratt and K. Lucas, 1979, pp. 3-15.

A Single Channel, NTSC Compatible Widescreen EDTV System, M. A. Isnardi et al., HDTV 10-4 to 8-87.

Extended Definition TV Fully Compatible with Existing Standards, Fukinuki et al., IEEE Transactions on Communications, vol. Com-32, No. 8, Aug. 1984.

P. Stucki, IBM Technical Disclosure Bulletin on "Black and White Graphics Transmission", Feb. 1969, p. 1187.

G. de Haan and W. Crooijmans, "Subsampling Techniques for High Definition MAC".

CCIR document JLWP 10-11/37, "Compatible Wideband Single-Channel HDTV Transmission", Sep. 1986.

IBA Report 112/81, "The Sampling of Television Images", May, 1981.

Masao Sugimoto of N. H. K., "Progress Report of HDTV in 1985", Jun.

Robert Hopkins, "Advanced Television", Feb. 1988.

Phillips Laboratories, "Hierarchical High Definition Television System Compatible with NTSC Environment", Sep. 1987.

Keith Lucas, "B-MAC and HDTV-Does it Fit?", Oct. 1987.

Advanced Television Systems committee, "United States Advanced Television Systems Committee Report T2/62-Multiplexed Analog Component Television Broadcast System Parameter Specifications", Apr. 18, 1987.

M. J. J. Annegarn et al., "HD-MAC A Step Forward in the Evolution of Television Technology", pp. 197-212, Aug. 8, 1987.

H. Sauerburger, "Broad and Narrowband Compatible Single-Channel HDTV Transmission", pp. 23-32, Jan/Feb. 1987.

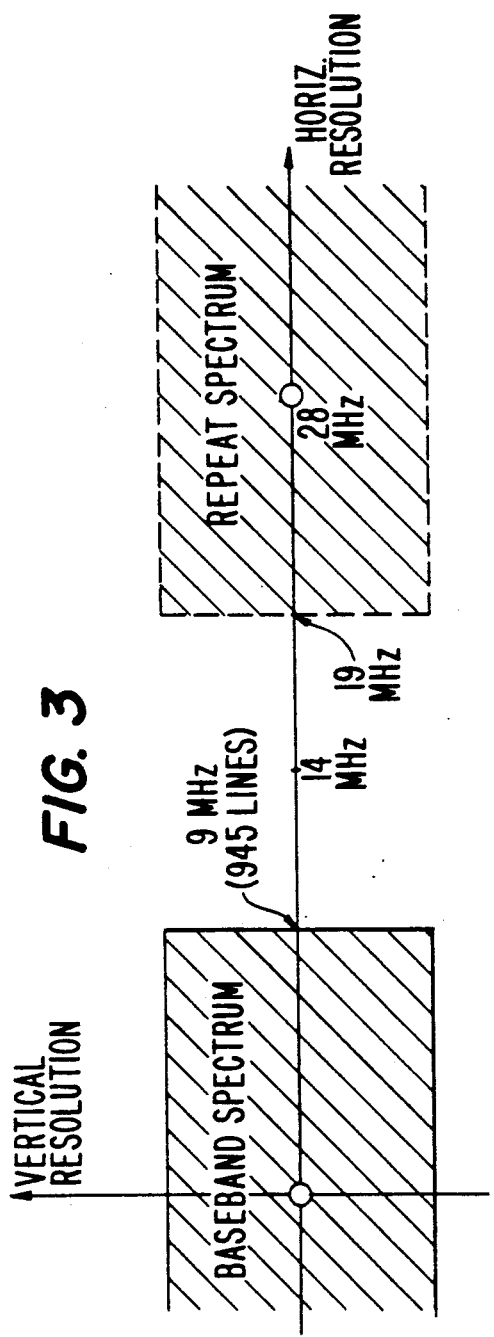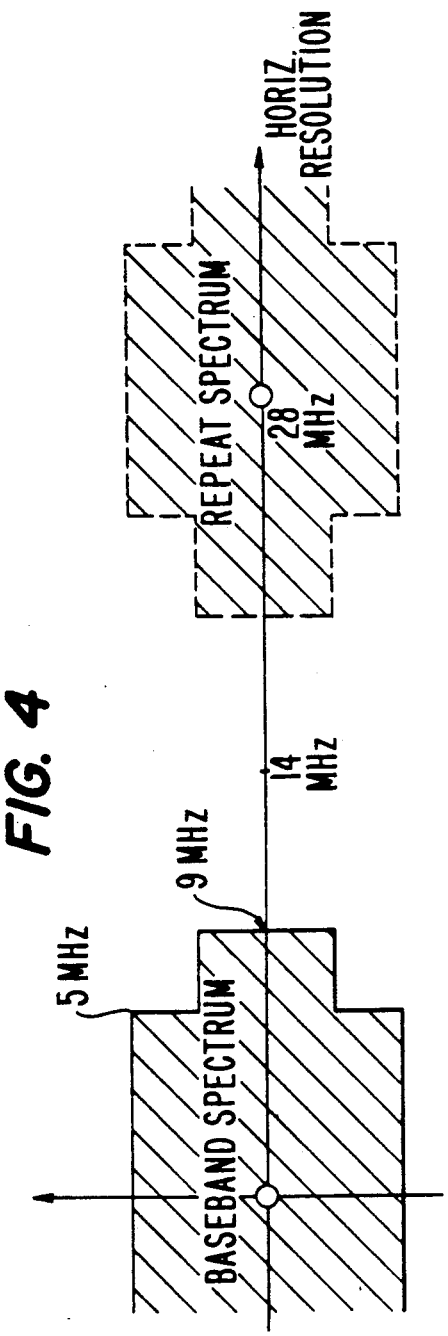

HIGH DEFINITION B-MAC TELEVISION SIGNAL TRANSMISSION SYSTEM

This is a continuation-in-part of U.S. patent application Ser. No. 092,305 filed Sept. 2, 1987, now U.S. Pat. No. 4,866,519, and a continuation-in-part of U.S. patent application Ser. No. 228,274 filed Aug. 4, 1988.

BACKGROUND OF THE INVENTION

1. Technical Field

The invention relates to the field of television signal transmission systems and, in particular, to a television signal transmission system for transmitting a signal providing a higher resolution image than is transmitted under standard resolution National Television Subcommittee (NTSC) or European formats.

2. Description of the Relevant Art

There is a growing interest in the transmission of television signals which increase picture definition in both the horizontal and vertical dimensions. In the vertical dimension, such a signal may have as many as twice the number of lines in comparison with existing standards while in the horizontal dimension, the number of picture elements per line is likewise increased. As a result of providing standard horizontal and vertical resolution, there are adverse effects from providing wide screen displays of a transmitted signal. A viewer of a standard signal may complain of the fuzzy or unclear quality of the image if viewed from a relatively close proximity. These adverse effects are overcome by a higher resolution image but existent transmission systems are not readily adaptable to transmitting a high resolution image.

One solution to the problem of providing a high resolution image without increasing the required bandwidth for signal transmission is described in copending parent application Ser. No. 092,305 filed Sept. 2, 1987. A high resolution signal is diagonally filtered and alternate samples decimated on alternate lines according to digital sampling techniques to leave a figure-of-five or quincunx pattern of picture samples. Odd line samples are added to even line samples forming a line summation signal. By means of skew-symmetric filtering techniques, high resolution horizontal information is folded into regions of the signal which normally carry diagonal information of marginal value. The loss of diagonal information from a transmitted signal does not cause perceptible impairment to the original high resolution input at the transmitter. Only video line stores are required at the transmitter. No field stores are required. Furthermore, the digital filtering required at a receiver is relatively inexpensive in comparison with prior art interpolation techniques.

Another solution to the problem of transmitting a high resolution image is to transmit a standard television signal and to create and transmit a so-called augmentation channel. In accordance with the first solution described above, a new receiver is required for processing the received signal of standard bandwidth. In accordance with the solution, no change in receiver circuitry is required for receiving and displaying a standard resolution image. However, separate adapter circuitry is required for receiving the augmentation channel containing high resolution data and for reinstituting the high resolution data into the standard resolution image to provide a high resolution image.

A method and apparatus for increasing the definition of an NTSC video signal using an augmentation channel is described in copending parent application Ser. No. 228,274 filed Aug. 4, 1988. According to the approach taken in that application both a line summation signal and a line difference signal are formed from a high resolution television signal. By reverse alternate sampling of the line summation signal at mid video signal bandwidth, high resolution horizontal information may be translated to baseband and added to high resolution vertical information from the line difference signal and transmitted together as the required augmentation channel.

Neither of these approaches, however, provides a solution to the problem of transmitting a high definition multiplexed analog components (MAC) television signal with increased horizontal and vertical resolution as compared with standard resolution television signals but which does not require modification of existing MAC receiver/decoders for receiving a standard resolution MAC composite signal.

During the 1970's sub-nyquist sampling techniques were applied in the art of digital television by the present inventor and colleagues at the Independent Broadcast Authority of the United Kingdom. Digital techniques for the elimination of aliasing are described in an article entitled "An Introduction to Sub-Nyquist Sampling" by K. H. Barratt and the present inventor appearing in the *I.B.A. Technical Review* at pages 3–15. In a companion article at pages 21–26, entitled "Digital Sub-Nyquist Filters" by J. H. Taylor, comb filters are described for down conversion and up-conversion of video data applicable in a PAL television signal environment for optimizing signal sampling. These anti-aliasing digital sampling techniques provide a developmental basis for improving horizontal resolution; however, there still remains a requirement in the art for a method and apparatus for improving both horizontal and vertical resolution of a transmitted multiplexed analogue components television signal.

SUMMARY OF THE INVENTION

The present invention relates to a method and apparatus for transmitting and receiving a high definition multiplexed analog components (MAC) television signal. According to the B-type MAC transmission format for composite signal transmission, the video signal is carried within an active line period while all other signals comprising at least audio, control data, utility data and teletext are transmitted during a line blanking period or a longer field blanking period. Separate luminance and chrominance signals are digitally sampled, compressed and transmitted during separate portions of a video line signal. In accordance with the well-known B-MAC format, luminance samples are compressed for transmission at a ratio of 3:2 while chrominance is compressed at a ratio of 3:1. Chrominance information is translated into U and V components, each component being transmitted every other line.

To accomplish a transmission of high resolution video information within the boundaries of multiplexed analog component formats generally and in accordance with the method of the present invention a folding of high horizontal resolution information is accomplished into the diagonal components of the sampled video signal. At baseband frequencies below 5 MHz (7 MHz when time-compressed 3:2 according to the format), the spectrum is unmodified. Thus, for example, since standard B-MAC decoders are typically equipped with 6.3 MHz passband lowpass filters at their input, the folded high resolution information does not affect reception. The additional transmitted information at high frequencies is simply blocked and ignored.

In particular, according to the present transmission method, a high definition analog television signal is first orthogonally sampled at 28 MHz (a rate of eight times the color subcarrier of 3.58 MHz or 8 Fsc). As a result a two dimensional sample spectrum is achieved which is then passed through a diagonal digital filter which decreases the diagonal frequency response but which decrease is practically imperceptible to a viewer.

The diagonally filtered data is then decimated by discarding alternate samples on alternate lines. As a result, a figure-of-five or quincunx pattern of samples remains. As a result of the decimation of alternate samples, the baseband spectrum remains unchanged but high resolution repeat spectrums comprising horizontal and vertical resolution components exist at half the sampling frequency and at the sampling frequency. The repeat spectrums serve to fold additional resolution into the baseband signal.

The samples of the folded signal may then be converted to analog form and passed through a low pass skew-symmetric filter centered at seven megahertz or similarly digitally filtered. Accordingly, high resolution information related to the horizontal dimension is folded about a diagonal axis at seven megahertz into the approximately five to seven megahertz or high frequency portion of the passed baseband signal. Effectively, the high resolution information is traded for the diagonal information.

According to transmission apparatus of the present invention, the digital diagonal filter of the encoder may comprise separable horizontal and vertical filters. The vertical filter at the transmitter may be very simple provided the horizontal filter is sufficiently complex to achieve a 40 db rejection in the stop band. For example, the horizontal filter at the transmitter (permitting a 0-5 MHz passband) may be at a complexity on the level of sixteen coefficients. Besides permitting a much simpler vertical filter at the transmitter to achieve a diagonal filter, it has also been found that as a result of employing a complex horizontal filter at the transmitter, a much less expensive and simpler diagonal filtering arrangement may be employed at the receiver. In particular, a 5-MHz low-pass filter at the receiver need comprise only eight coefficients. While the invention is described in terms of improving luminance horizontal detail, the technique and apparatus may be adapted for improving chrominance horizontal detail.

BRIEF DESCRIPTION OF THE DRAWINGS

FIG. 3 is graphical depiction of vertical versus horizontal definition as a result of application of the orthogonal sampling grid of FIG. 2 such that a baseband spectrum results as well as a repeat spectrum centered at the sampling frequency.

FIG. 4 is a graphical depiction of vertical versus horizontal definition with diagonal information, a block of data, for example, between five and nine megahertz, having been filtered from the orthogonally sampled spectrums of FIG. 3.

FIG. 8 is a graphical depiction of a first step of processes accomplished at a receiver. By applying a resampling at fourteen megahertz using the figure-of-five pattern shown in FIG. 5, the folded high resolution horizontal dimension information is returned to high frequency.

DETAILED DESCRIPTION OF THE DRAWING

Figure 1:
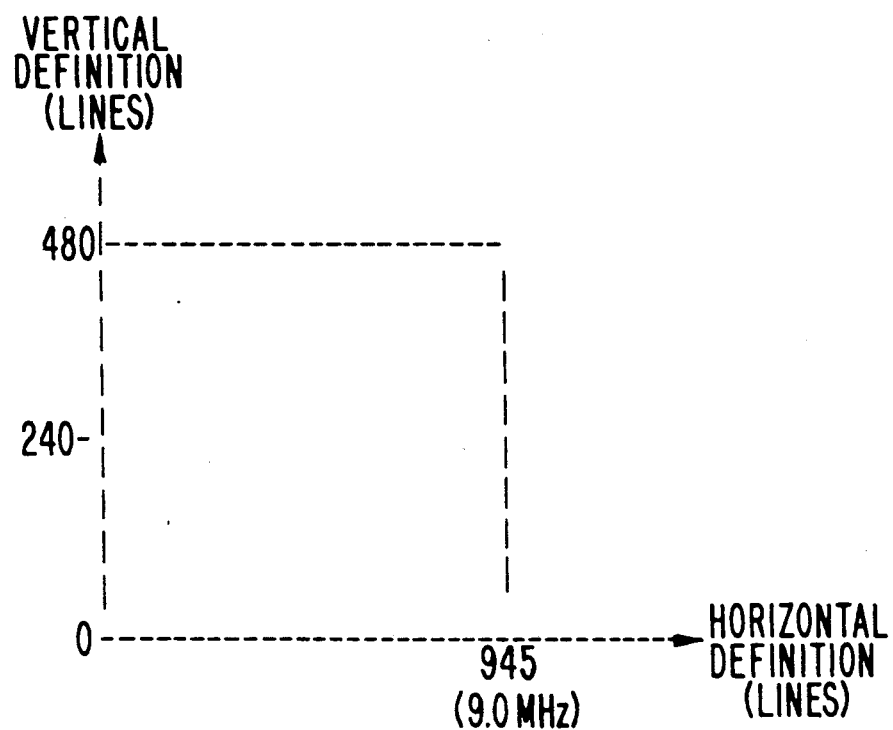
FIG. 1 is a graphical depiction of vertical versus horizontal definition for a high definition television signal.

Referring to FIG. 1 there is shown a high definition television signal graphically depicted in terms of vertical versus horizontal resolution.

According to FIG. 1, the present method is assumed applicable to a high definition 16:9 aspect-ratio picture scanned sequentially using 525 lines, the horizontal resolution being at least 945 lines at 9 megahertz. A sequential scan signal of this type supports a vertical definition of 480 lines.

With this signal as an input, this description refers by way of example to a new type of B-MAC signal which carries increased resolution at the imperceptible expense of diagonal resolution. However, it may be likewise applied in other multiplexed analog component video signal transmission systems. The increased resolution is folded into the high video frequencies. At baseband frequencies below 5 MHz (7 MHz when time-compressed in MAC) the spectrum is unmodified. As known B-MAC decoders have low-pass input filters having a pass band limited at 6.3 MHz, decoder operation is unaffected by the additional transmitted information. On the other hand, a B-MAC decoder in accordance with the present invention retrieves and decodes the folded horizontal detail information and causes a high resolution image to be displayed by a receiver.

A standard resolution 525-line 2:1 interlace video signal consists of two fields each containing 240 active lines. Lines of every other (odd) field are spatially offset relative to lines of even fields so that all 480 active lines are regularly spaced on the display screen.

In principle, this line structure can carry a vertical resolution equal to 480 lines for static pictures. However, a normal interlaced display does not achieve this value. The reason for this lies in the fact that only 240 lines are displayed in each field, and the human eye/brain is expected to sum the two fields and perceive all 480 lines. It cannot do this perfectly. The intensity of the first field perceived by the eye/brain has decreased to 50% of its initial value by the time that the second field arrives (1/60 seconds later). This has two consequences:

(i) Line structure becomes visible in the display.
(ii) Vertical frequencies exceeding 240 lines are partially aliassed in the display.

The net result is that the perceived vertical resolution of a standard resolution 525 line interlaced display lies somewhere between 480 lines and 240 lines. The reduction from 480 lines is conventionally described by introducing the concept of a so-called "Kell Factor":

$$\text{Perceived Resolution} = 480 \times 0.66 \text{ (Kell Factor)}$$
$$= 320 \text{ Lines}$$

For static pictures, Kell Factor may be entirely eliminated and resolution restored to 480 lines by displaying all 480 lines (from both odd and even fields) in each 1/60 second field period. This technique is known as scan conversion. Application of the technique involves use of a field store memory storing all 240 active lines to move information between fields, and a display at twice the normal line frequency. However, the method can be directly applied only to static parts of the picture, since significant motion can occur between fields. Consequently, a motion detector is also required so that interfield interpolation can be used for stationary objects, while line-interpolation is used for moving objects.

Scan conversion techniques employing adaptive field-store line doubling techniques thus achieve 480 lines of vertical resolution for static pictures and approximately 320 lines in moving dynamic areas of an image.

Field store line-doubling is gaining acceptance as a standard method for increasing vertical definition by TV-set manufacturers. Its main advantage is that it eliminates line structure and significantly improves picture quality without requiring any additional information transmitted. Several manufacturers of TV-sets and projectors are using proprietary line-doubling techniques, including Philips, Hitachi, Sony, Ikegami, etc. Its obvious advantages are:

0.01 The technique applies equally to component signals (luminance, chrominance) or NTSC signals received from any source including S-VHS VCRs.
0.02 The technique is applied in the television receiver and therefore permits retention of a 525 interlace connection to the TV-set (NTSC or wideband Y/C).
0.03 The field-store in the TV set image projector can be used for other consumer features such as picture-in-picture and noise reduction.
0.04 The technique requires no additional transmitted information and allows any high definition television (HDTV) format to concentrate on the problem of increasing horizontal definition.

In companion co-pending application Ser. No. 255,328, filed concurrently herewith of Christopher Birch entitled "Scan Conversion Method and Apparatus", there is described a technique for improving the vertical resolution of a television signal by developing a plurality of alternative interpolated values for display and selectively choosing a particular value in accordance with tests of the video signal for shading, movement and vertical edge transitions.

In order to solve the problem of increasing horizontal resolution, the present high definition MAC system employs sub-Nyquist sampling (spectrum folding) to trade diagonal resolution for increased horizontal resolution. The process will be described in connection with FIGS. 2–9 and the apparatus at a transmitter or receiver will be described in connection with FIGS. 10–11. All frequencies quoted (bandwidths and sampling frequencies) will be referred to the uncompressed luminance signal of a B-MAC signal. Equivalent bandwiths and sample frequencies in the time-compressed (MAC) domain must be increased by a factor of 1.5 (3:2).

Figure 10:
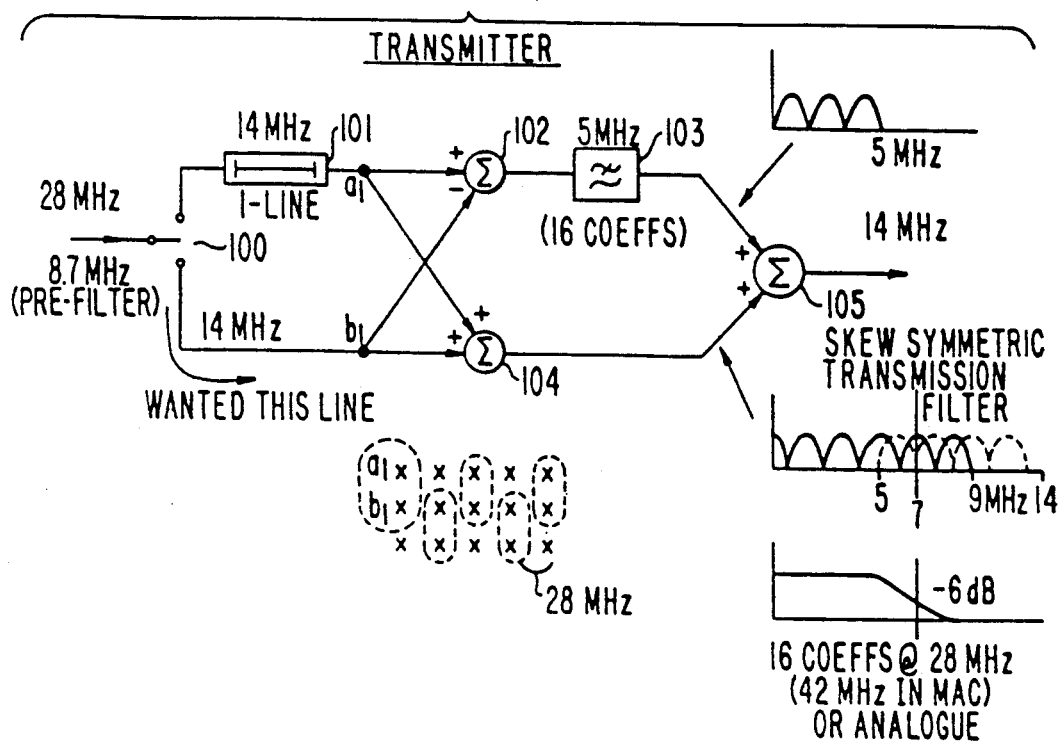
FIG. 10 is a schematic diagram of apparatus of a transmitter for encoding a high definition B-MAC television signal.

The 525-line 2:1 interlaced luminance signal is first bandlimited to 9 MHz using a low-pass analog filter. Referring briefly to FIG. 10, the filter is described as an 8.7 MHz pre-filter. This bandwidth (BW) is sufficiently broad to achieve a horizontal resolution of 945 lines per picture width (PW), calculated as follows:

$$\text{Lines}/PW = BW \times \frac{\text{Active Line}}{\text{Total Line}} \times \frac{2}{\text{Line Freq}} = 945 \text{ Lines}/PW$$

Figure 2:
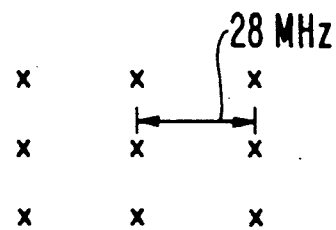
FIG. 2 is a representation of an orthogonal sampling grid for sampling the signal of FIG. 1 at 28.6 megahertz (8 Fsc after prefiltering at 9 megahertz).
Figure 5:
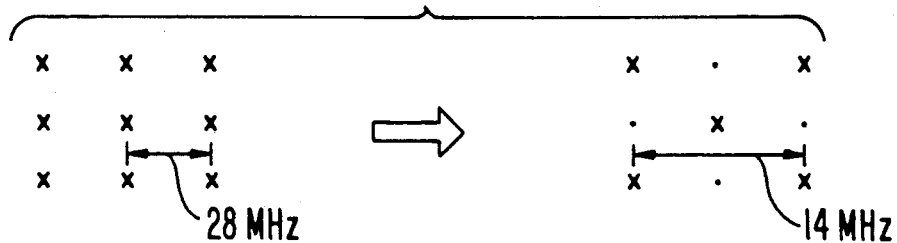
FIG. 5 is a representation of a sampling grid at 14 MHz generated by discarding alternate samples on alternate lines to achieve a figure-of-five or quincunx sample pattern.

This signal is initially sampled at 28.6 MHz (8 Fsc) using an orthogonal sampling grid as shown in FIG. 2. As a result of orthogonal sampling and in accordance with FIG. 3, a basband spectrum as well as a repeat spectrum centered at the sampling frequency results. The baseband spectrum comprises high horizontal resolution components at as high as 9 MHz or 945 lines as calculated above.

A diagonal digital filter is then applied which decreases the diagonal frequency response (Step 2). Separable horizontal and vertical filters are employed for simplicity as will be further described in connection with the discussion of FIGS. 10 and 11. Referring to FIG. 4, it may be seen that blocks of diagonal (horizontal versus vertical) information are removed at horizontal frequencies between five and nine megahertz in the baseband spectrum as well as the repeat spectrum.

Now, alternate samples are discarded leaving a "quincunx" (figure-of-five) sample pattern at approximately 14 MHz (4 fsc) without causing aliasing. According to FIG. 5, alternate samples on alternate lines are removed.

Figure 6:
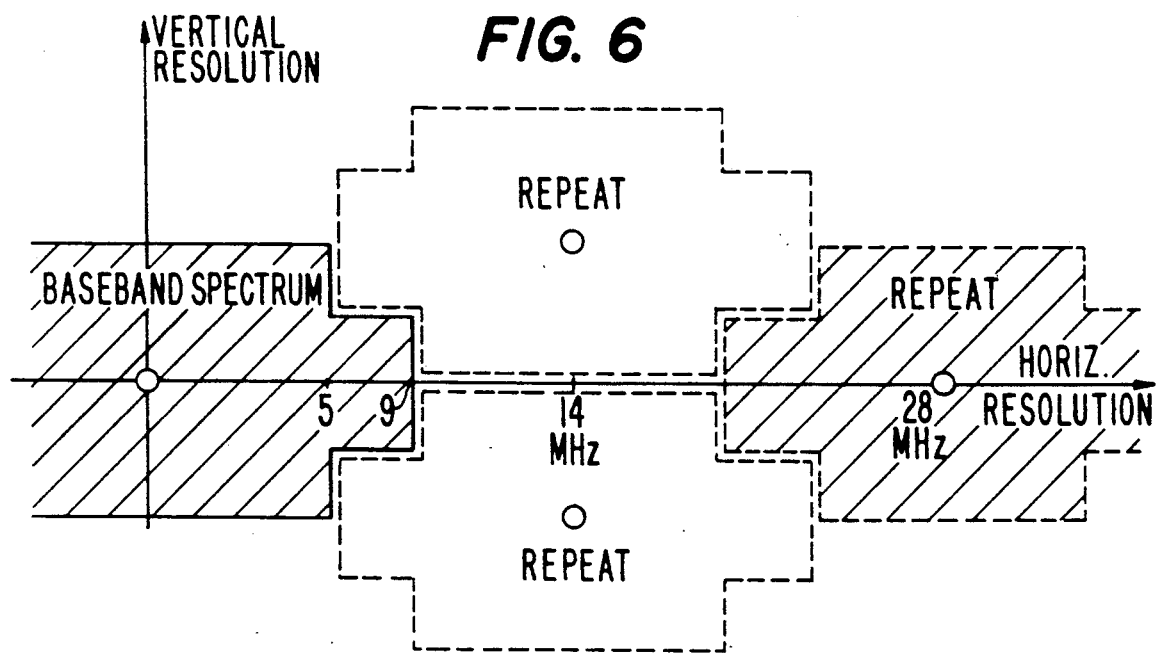
FIG. 6 is a graphical depiction of the result of the decimation of alternate samples where, besides the repeat spectrum at 28 MHz, two repeat spectrums at 14 MHz, half the initial sampling rate are introduced.

The result of Step 3 is a sequence of digital samples which now have the compacted 2-dimensional spectrum shown in FIG. 6 wherein repeat spectrums exist at the fourteen megahertz sampling frequency of the alternate sample decimation step.

Figure 7A:
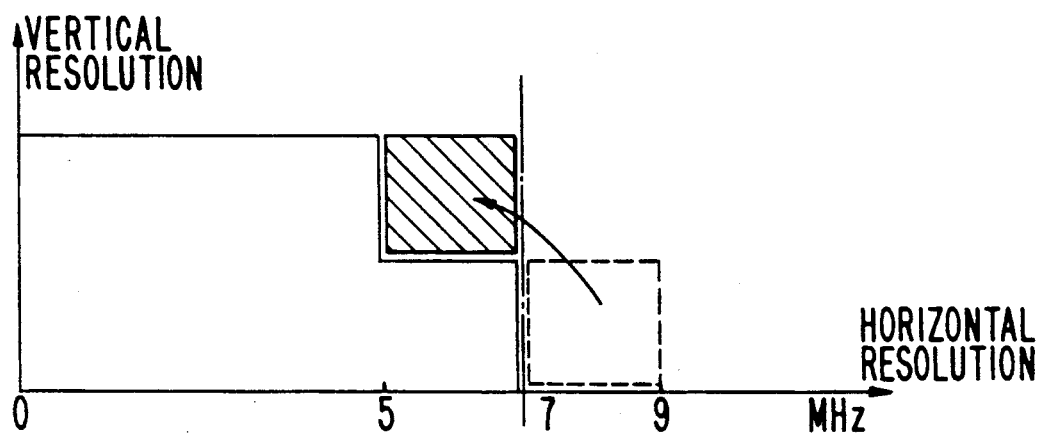
FIG. 7a is a graphical depiction of vertical versus horizontal resolution for showing the process of filtering about a center frequency of approximately 7 MHz, the filter having a skew-symmetric low-pass response and FIG. 7b the characteristic amplitude versus frequency response.
Figure 7B:
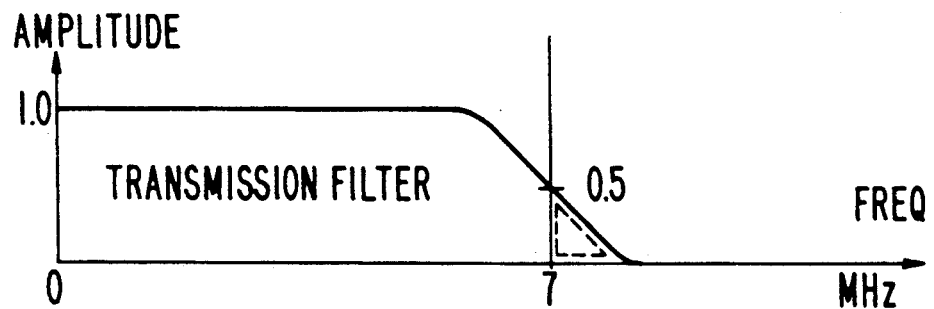

Before transmission, the horizontal resolution improvement information is folded into the signal for transmission. For example, the samples may be converted to analog form and passed through a transmission filter with specific characteristics. The analog transmission filter may have skew-symmetric low-pass response which is −6 dB at 7 MHz. The result is shown in FIG. 7a where high resolution information at 7-9 megahertz is translated to fill the void formed from diagonal filtering. Alternatively, a digital non-recursive filter may be applied as will be further described herein alleviating a requirement for digital to analog conversion or upconversion to 28 megahertz sampling.

Effectively, horizontal resolution between 7 MHz and 9 MHz has been folded around 7 MHz and replaces diagonal resolution between 5 MHz and 7 MHz. According to FIG. 7b, the filter characteristic response is shown at 6 dB attenuation at 7 MHz. Note that in multiplexed analog component (MAC) transmission, the transmission filter will be skew-symmetric about $1.5 \times 7$ MHz due to the time compression factor (3:2). The signal is now ready for transmission, which may be considered step 5.

When the signal is received, it is resampled at 14 MHz using the alternate line quincunx (figure-of-five) sampling pattern (step 6). By resampling at fourteen megahertz, a translation of the high frequency information occurs to 7-9 MHz according to FIG. 8a.

Figure 8A:
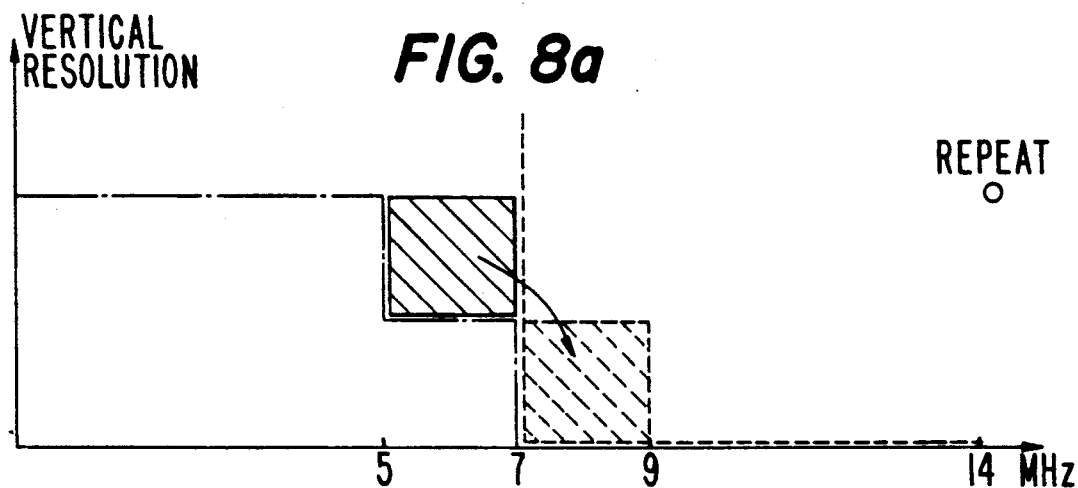
FIG. 8a represents a first graphical depiction of vertical versus horizontal definition and FIG. 8b represents a second graphical depiction of amplitude versus frequency showing how aliasing is eliminated and information close to 7 MHz is regenerated by the skew-symmetric characteristic of the filter.
Figure 8B:
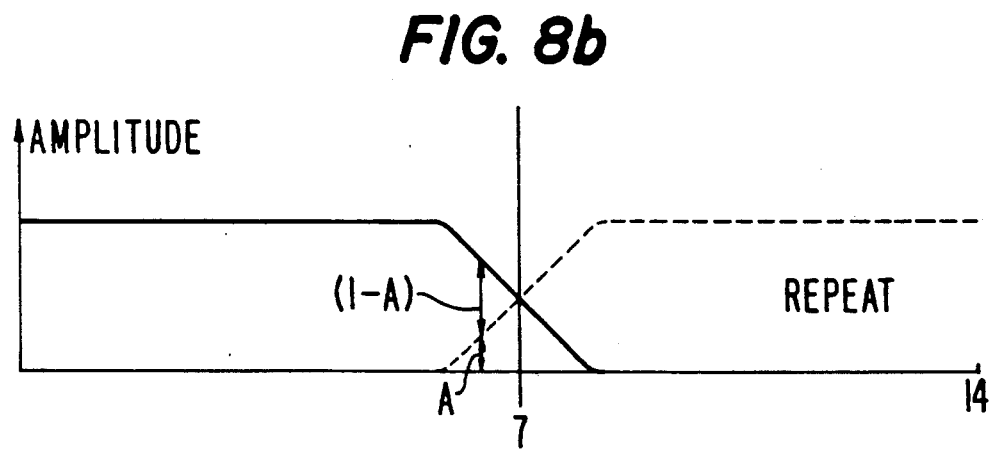
Figure 9:
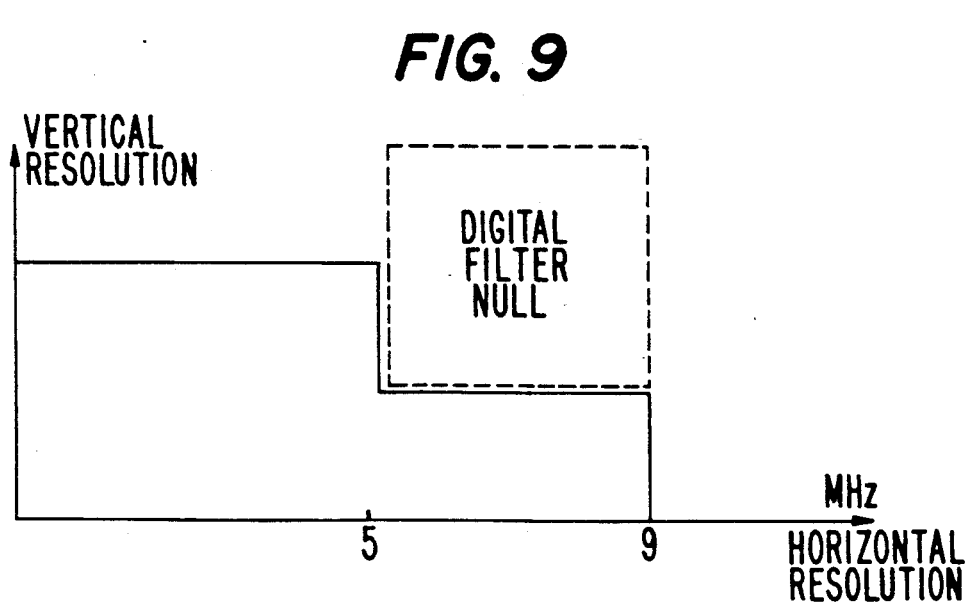
FIG. 9 is a graphical depiction of vertical versus horizontal definition showing the result of upconverting from 14 megahertz to 28 megahertz. Upon diagonal filtering, a null for high diagonal frequencies in the range of 5-9 megahertz is produced leaving a signal having high horizontal resolution but an imperceptible sacrifice in diagonal information.

The resampling process thus regenerates the horizontal energy between 7 MHz and 9 MHz. Referring to FIG. 8b, losses in the transmission filter around 7 MHz are also precisely compensated by the alias term A, provided the transmitting filter in combination with the decoder process has a skew-symmetric response: $A+(-1-A)=1$. In other words, the alias term introduced is necessarily cancelled no matter where the amplitude A is measured in the overlapping dashed line, solid line area proximate to 7 MHz.

The spectrum of FIG. 8 applies to the 14 MHz sequence of quincunx samples. What may remain is to upconvert to 28 MHz, introduce a 2-dimensional filter to remove the remaining energy on the diagonal, and to bandlimit the signal to 9 MHz.

A diagonal filter (which produces a null for high vertical frequencies in the range of 5-9 MHz) cannot be implemented at the 14 MHz sample rate. Therefore, the up-conversion of sample rate to 28 MHz occurs as a part of the digital filtering process. According to FIG. 9, the upconversion and diagonal filtering results in a null at diagonal frequencies and improved horizontal resolution.

Step 7 results in a sequence of samples at 28 MHz with an orthogonal sampling grid. They carry a spectrum with horizontal resolution of 9 MHz, with no aliassing. These samples are available for direct conversion to analog form. After bandlimiting to 9 MHz, the analog signal may be displayed on a high definition receiver.

Alternatively, the samples may be passed directly to a known but proprietary field-store scan converter for line-doubling to increase the vertical definition such as the apparatus described by U.S. application Ser. No. 255,328, entitled "Method and Apparatus for Improving Vertical Definition of a Television Signal by Scan Conversion" of Christopher Birch filed concurrently herewith and incorporated herein by reference. The result of the scan conversion is a 525 sequential-scan signal sampled at 56 MHz ($2 \times 28$ MHz) and carrying horizontal luminance resolution up to 18 MHz. (The line doubling process halves the active line period and doubles both the sampling frequency and the video bandwidth).

The described process provides a very cost effective implementation in a multiplexed analog component signal transmission systems as will be described in connection with block schematic diagrams FIGS. 10-11 of the encoder and the decoder respectively of the present apparatus.

Transmitter apparatus according to FIG. 10 performs all steps of the above described process but for transmission:

step 1, 28 MHz orthogonal sampling after application of an 8.7 MHz pre-filter;

step 2, digital diagonal filtering;

step 3, 28 MHz-14 MHz alternate sample decimation; and step 4, digital to analog conversion and skew symmetric transmission filtering.

Although it may appear that the diagonal filter must be implemented at a sample rate of 28 MHz, the fact that samples are to be discarded at step 3 allows a simplification. FIG. 10 shows a configuration in which the main elements of the digital filter can be implemented at a 14 MHz sample rate.

Figure 12:
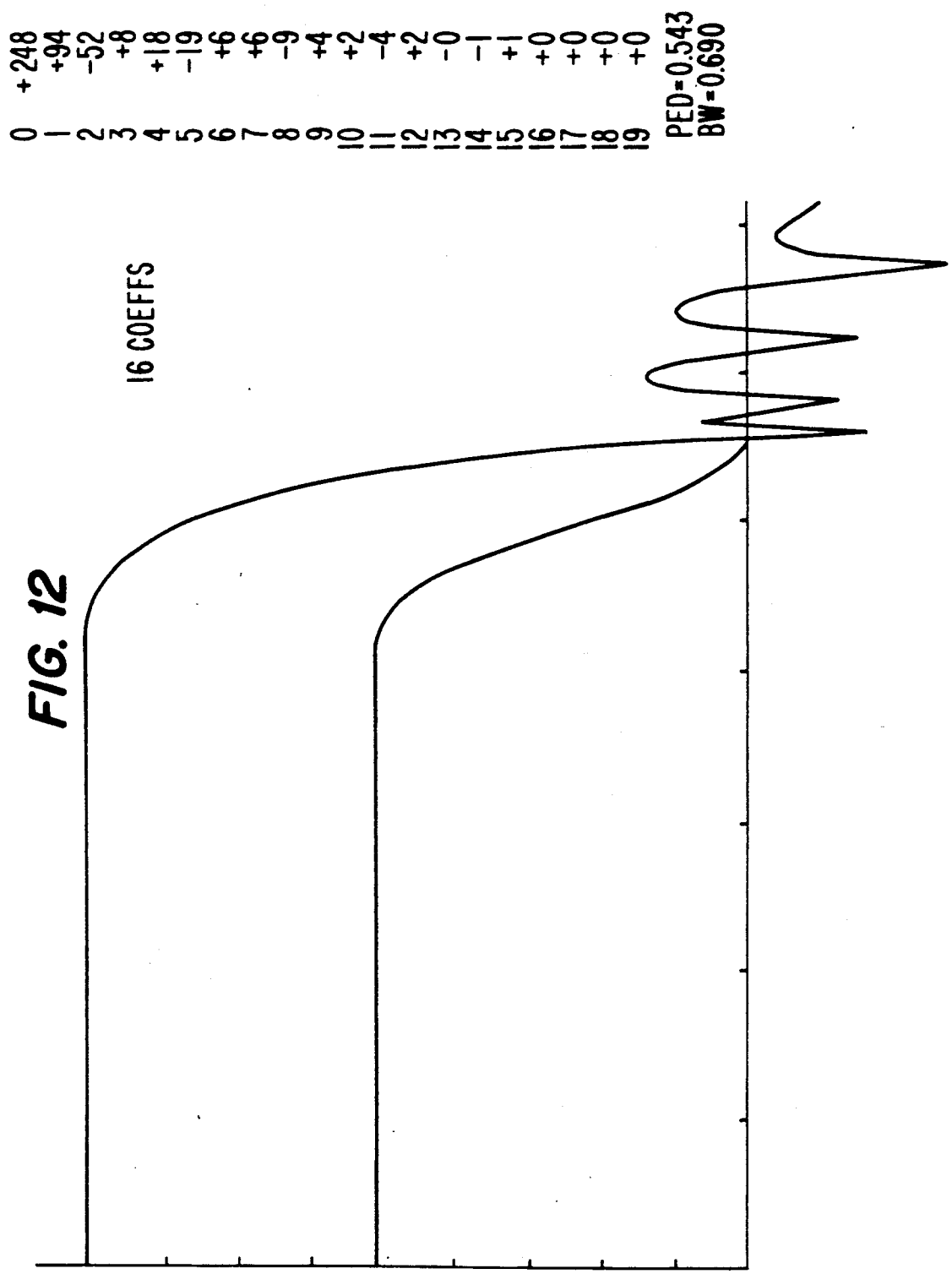
FIG. 12 is a graphical representation of the characteristic response of the sixteen coefficient horizontal lowpass filter, including coefficient data, shown in FIG. 10.

The diagonal filter is implemented as two separable (horizontal and vertical) filters. It has been found that the vertical filter can be very simple i.e., a line store 101 and adder 102 provided the horizontal filter 103 achieves approximately a 40 dB rejection in the stop band. To accomplish such a rejection, the horizontal filter 103 (5 MHz low-pass) employs 16 coefficients at 28 MHz. The design of the horizontal filter 103 is a symmetrical non-recursive filter which has been optimized with 9-bit coefficient values. The response and the coefficients are presented in FIG. 12.

According to FIG. 10, switch 100 switches alternate samples of a pre-filtered 28 MHz sampling signal into two 14 MHz paths. According to the upper path, the samples are vertically filtered and horizontally filtered. The lower path is substrated from the upper path at adder 102 while the upper path is added to the lower path at adder 104. At the output of filter 103 is shown a low pass combing characteristic with zero energy at zero frequency while at the output of adder 104 is shown a low frequency aliassed characteristic (solid line) with energy at zero frequency extending to 9 MHz and a high frequency combing characteristic (dotted line) extending from 5 MHz up. The result at the output of adder 105 is a signal for transmission with horizontal resolution folded into the 5-7 MHz region. For each a1, b1 sample pair, one sample remains from quincunx sampling on alternate lines, separated by 14 MHz as shown. Consequently, a 28 megahertz process is accomplished at 14 MHz because of the alternate sample decimation.

Figure 11:
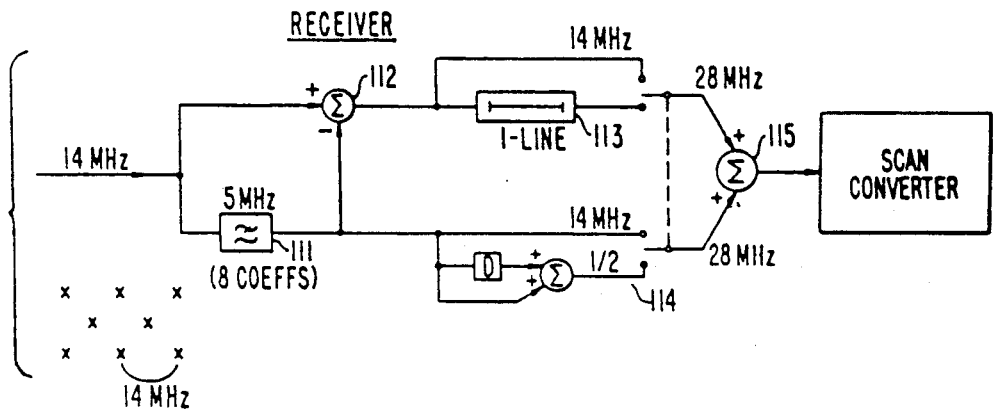
FIG. 11 is a schematic diagram of apparatus of a receiver for decoding a high definition B-MAC television signal.
Figure 13:
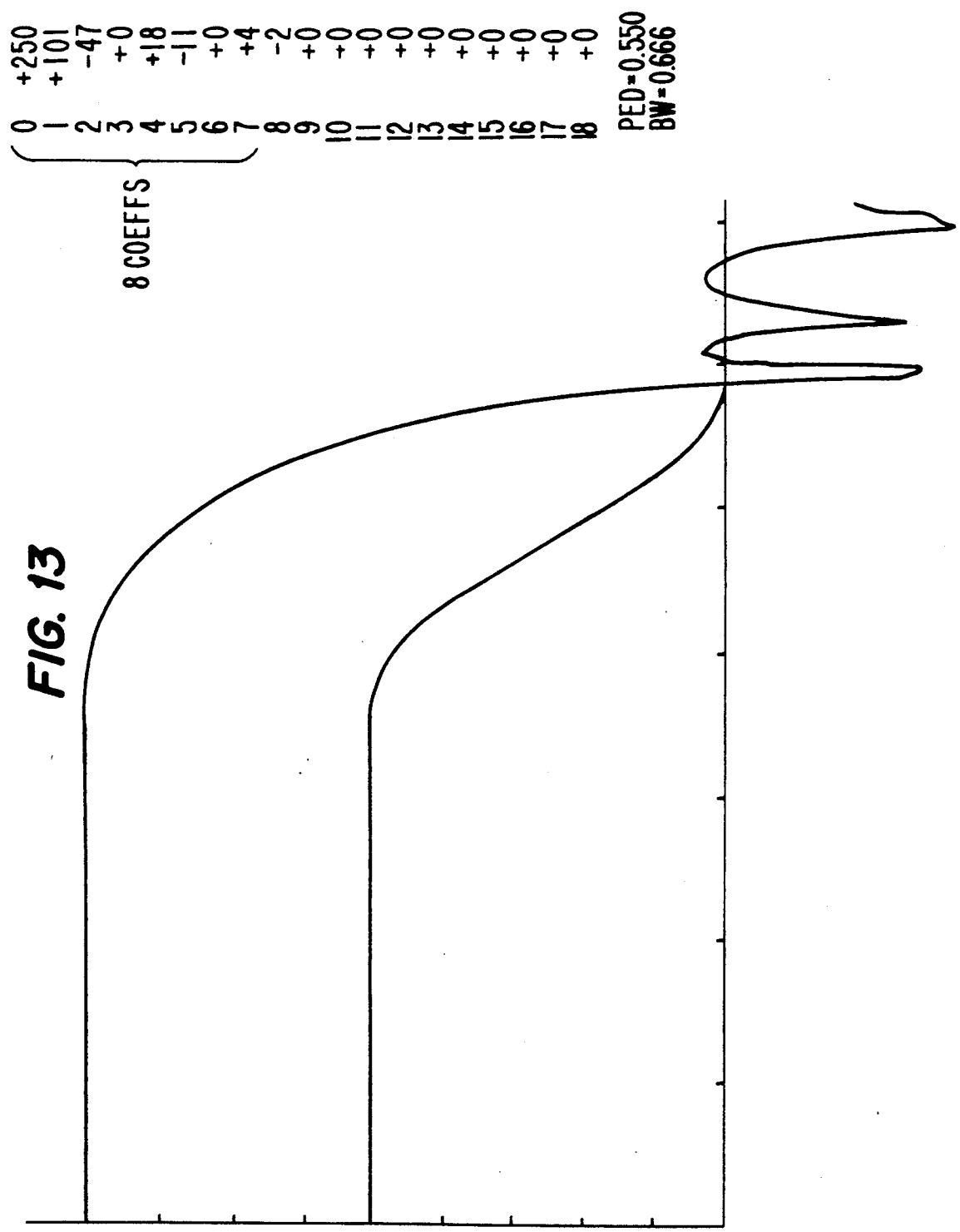
FIG. 13 is a graphical representation of the characteristic response of the eight coefficient horizontal lowpass filter, including coefficient data, shown in FIG. 11.

FIG. 11 shows the decoder, in which it is also possible to implement the digital filter at 14 MHz. In this case, the 5 MHz low-pass filter 111 contains only 8 coefficients, the characteristic response and coefficient data are shown in FIG. 13.

According to FIG. 11, a 14 MHz input signal is sampled according to the figure-of-five sampling pattern shown at 14 MHz. The receiver decoder further comprises adder 112 and line store 113 in an upper path. The lower path further comprises interpolation circuit 114 including single element delay D and averager (divide-by-two) circuits for restoring missing data to the sample pattern. The upper and lower paths are switchably upconverted at 28 MHz and added at adder 115.

Figure 14:
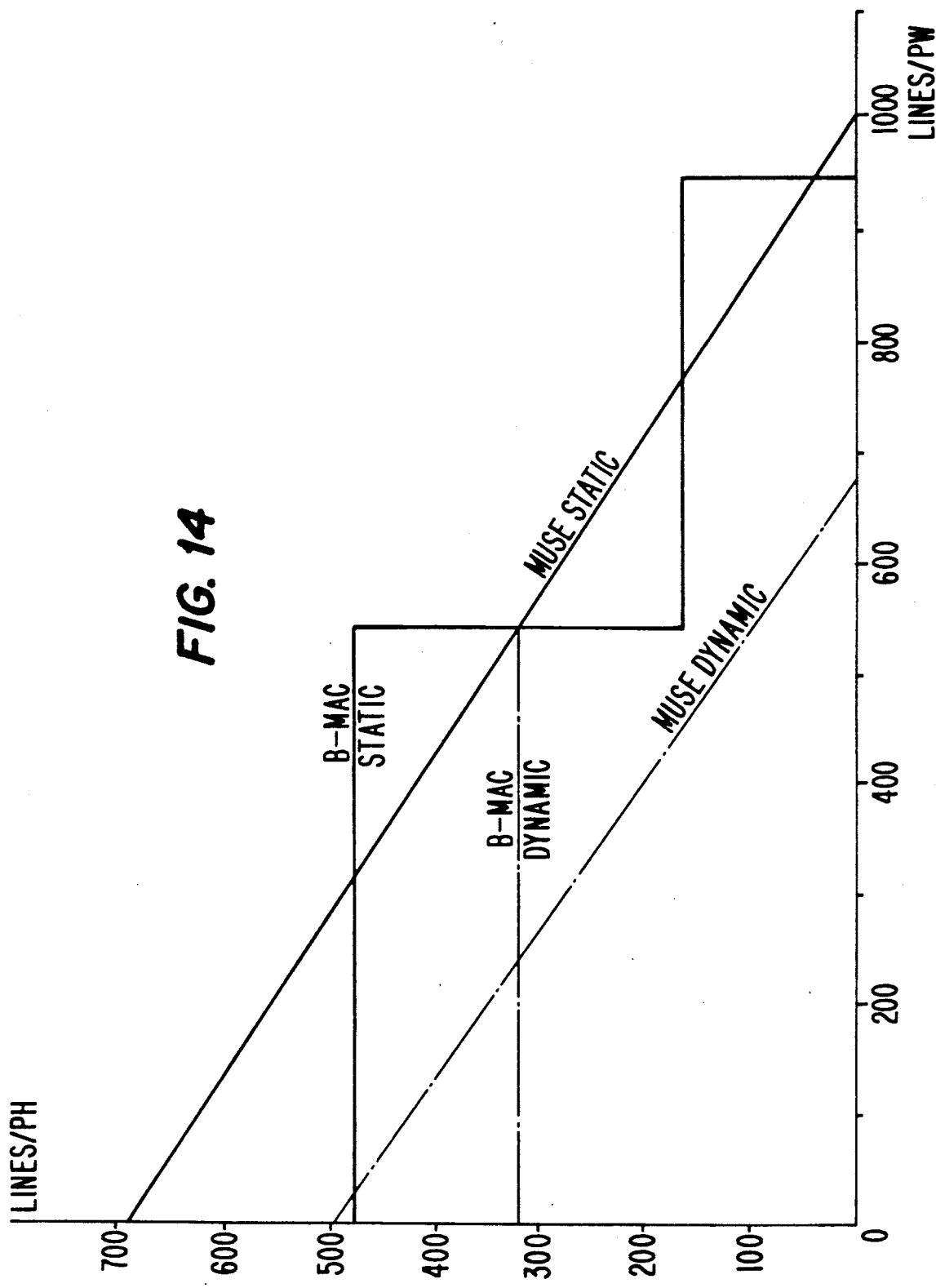
FIG. 14 is a graphical representation of vertical resolution in lines per picture height versus horizontal resolution in lines per picture width showing characteristics of the application of the present invention in combination with conventional but proprietary scan conversion line doubling techniques in B-MAC versus results of more expensive multiple field store techniques used in a 1125 line MUSE signal transmission system.

FIG. 14 shows the idealized two-dimensional frequency response achieved by the system in comparison with the known high definition 1125-line MUSE system developed by Japan Broadcasting Corp. (NHK). The MUSE system involves a plurality of field stores and thus is considerably more expensive to implement than the present invention including scan conversion apparatus involving one field store. Nevertheless, for dynamic or static images, the horizontal resolution is either equivalent or clearly superior to the MUSE system according to the present invention and with scan conversion is almost comparable in vertical definition.

Figure 15A:
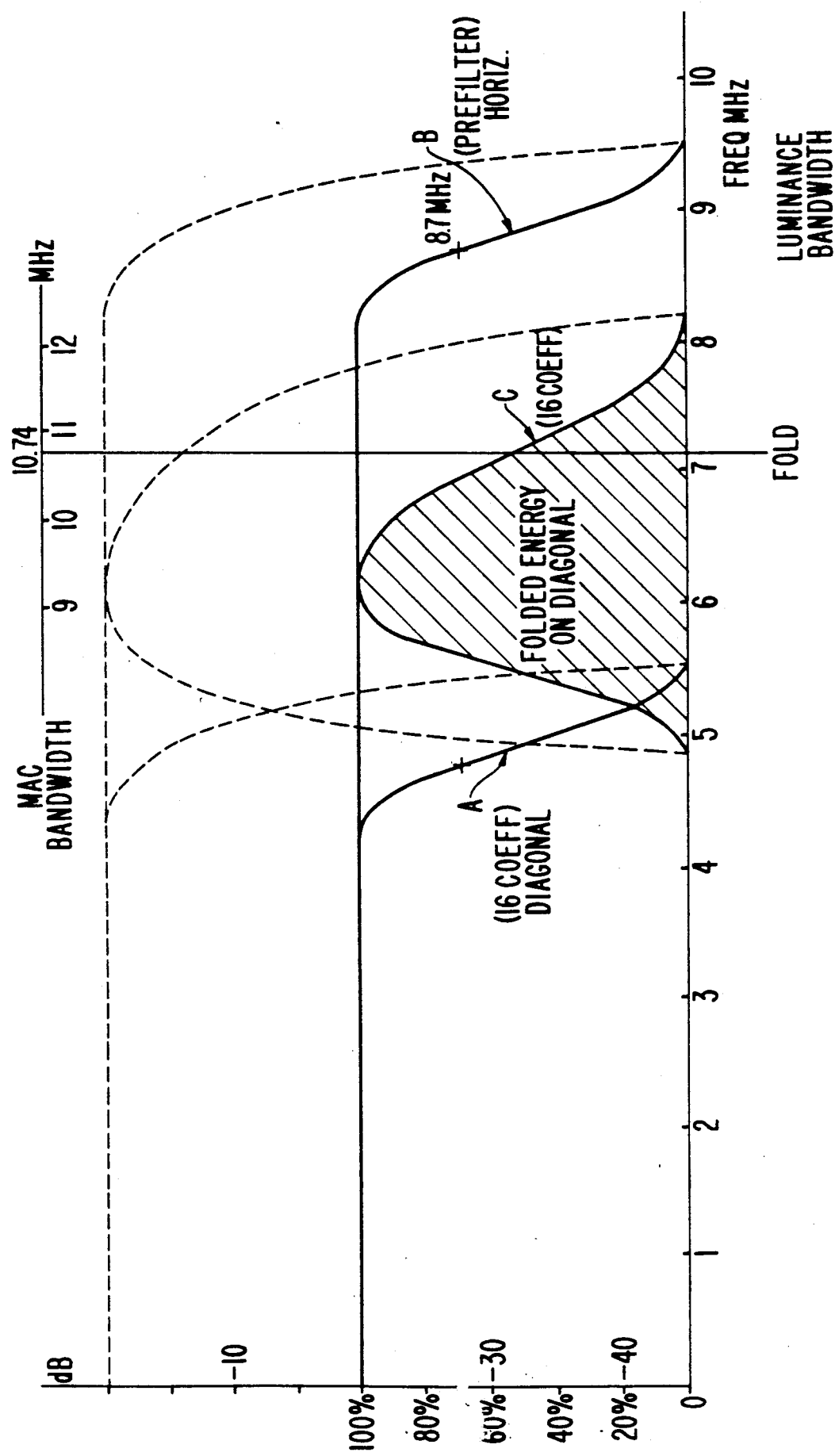
FIG. 15 is a graphical representation of amplitude versus frequency and horizontal versus vertical resolution for the three filters applied in the present technique: diagonal filtering, prefiltering and skew-symmetric filtering, FIG. 15a being of amplitude versus frequency and FIG. 15b being of vertical versus horizontal resolution.
Figure 15B:
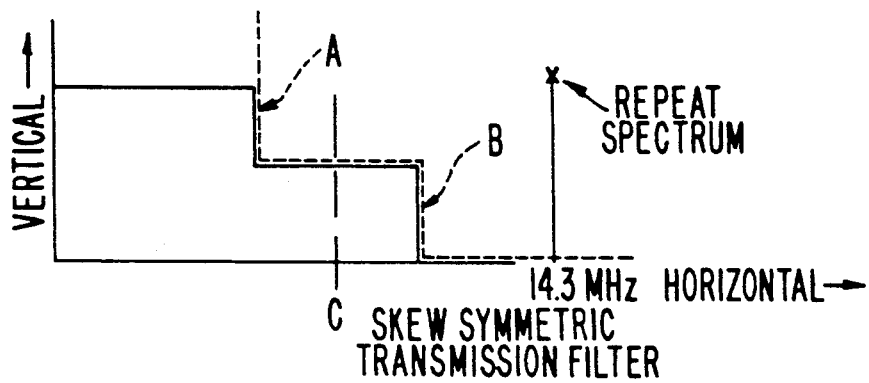

FIG. 15 shows the actual response achieved using the filters which have been described. According to FIG. 15a, the position of the folded energy (hatched area) is also shown in one-dimension. In either FIG. 15a or 15b, A relates to the encoder diagonal filter, B to the pre-filter and C to the skew symmetric filter. The skew-symmetric transmission filter may be implemented in analog form, according to the above-described method. According to the above-described apparatus, a symmetrical non-recursive filter may be used alternately which produces an ideal linear phase characteristic. If a digital filter is used to create the skew-symmetric response, it is unnecessary to up-convert to 28 MHz sampling. The required digital filter will have zeros in all alternate coefficients except for the central term and so leads to a 14 MHz implementation. (A 28 MHz implementation is not required when alternate samples are automatically dropped with alternate zero coefficients. The central term is dealt with separately). FIG. 15 assumes use of a 16 coefficient non-recursive filter.

Figure 16:
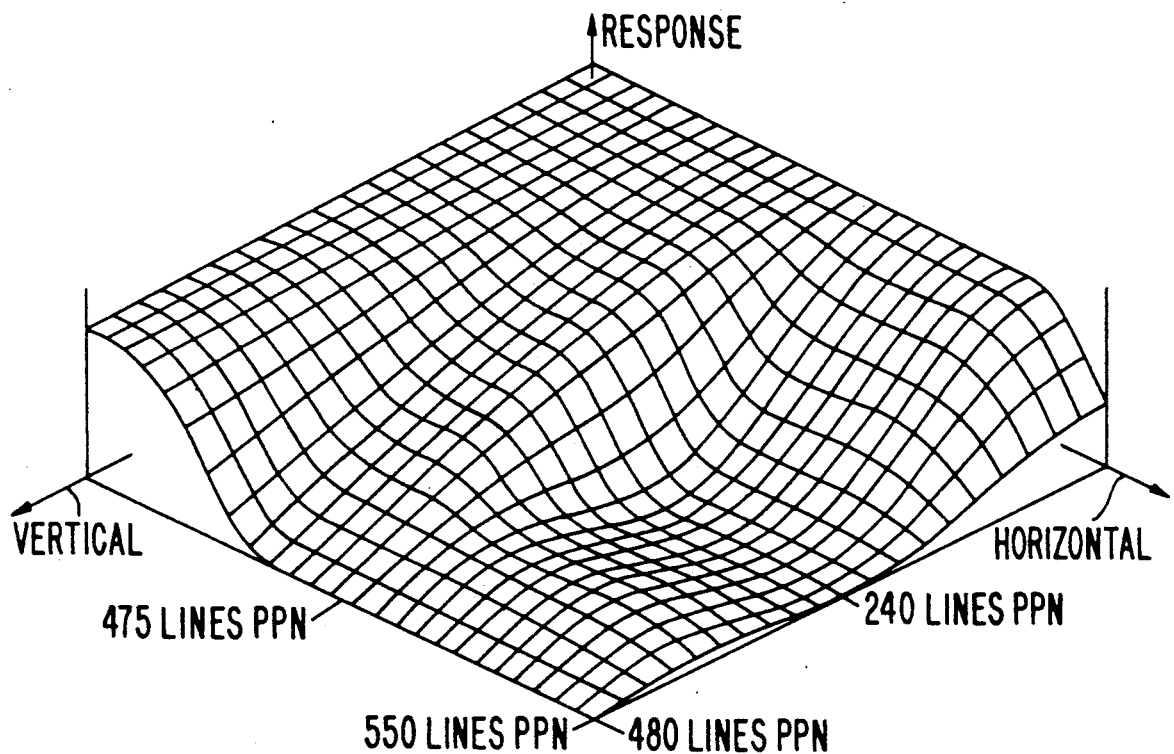
FIG. 16 is a graphical depiction of the two dimensional contour response of the transmitted signal comparable to FIG. 14, horizontal resolution being traded for diagonal resolution in a system according to the present invention.

FIG. 16 shows the actual 2-dimensional response achieved by the system. From FIG. 16 in comparison with FIG. 14 shows improved horizontal resolution out to 945 (950) lines at the cost of diagonal information. In accordance with the above-described embodiment and method, luminance horizontal resolution is improved and with scan conversion vertical resolution improved as well. The present invention may be adapted to provide improved chrominance horizontal resolution recognizing the 3:1 compression of U/V chrominance data in alternate transmitted lines. Scan conversion has already been adapted for obtaining chrominance vertical resolution improvement.

I claim:

1. A method at a transmitter of a television signal transmission system for encoding a high definition television signal with increased horizontal detail for transmission consistent with a multiplexed analog component signal format, the encoded signal being adapted for reception at either a standard resolution or a high definition television receiver of the system, the encoding method comprising the steps of:
   (i) sampling the high definition television signal orthogonally at a first sampling rate,
   (ii) filtering the orthogonally sampled television samples to filter diagonal information at frequencies higher than a rectangular baseband spectrum for standard television resolution and to preserve the rectangular baseband spectrum for standard television resolution unfiltered, and
   (iii) decimating alternate samples on alternate lines leaving a quincunx pattern, for
   folding a high frequency horizontal detail spectrum component of the output about a first predetermined frequency above an upper limit frequency for standard resolution television and for preserving the rectangular baseband spectrum for standard resolution television by filtering the output of the decimation step in accordance with a skew-symmetric low-pass frequency response, the filtered diagonal resolution being replaced with at least high frequency horizontal detail information,
   the encoded high definition television signal being adapted for reception at either a standard resolution or a high definition television receiver, a standard resolution television receiver comprising a low pass filter for filtering the frequencies above the upper limit frequency for standard resolution television and for passing the preserved baseband spectrum and a high definition television receiver comprising spectrum unfolding means for unfolding the high frequency horizontal detail and scan conversion means for increasing vertical resolution.

2. The method of encoding a high definition television signal for transmission in accordance with claim 1, the filtering step (ii) comprising the separate steps of
   horizontally filtering the sampled television samples via a complex filter and
   vertically filtering the horizontally filtered samples via a filter less complex than the horizontal filter.

3. The method of encoding a high definition television signal for transmission in accordance with claim 1, the filtering step (ii) performed at a second sampling rate approximately half the first rate.

4. The method of encoding a high definition television signal for transmission in accordance with claim 1, the filtering step comprising the step (ii) of
   temporarily storing alternate orthogonal samples in a line store.

5. The method of encoding a high definition television signal for transmission in accordance with claim 1 further comprising the step of converting the quincunx sample pattern of the alternate sample decimation step to an analog signal and wherein the skew-symmetric filtering step is accomplished via an analog filter in accordance with a frequency response having approximately 6 dB of loss at approximately seven megahertz.

6. The method of encoding a high definition television signal for transmission in accordance with claim 1 in which the sampling step (i) occurs at a sampling rate of approximately 8 fsc.

7. The method of encoding a high definition television signal for transmission in accordance with claim 1 in which the rectangular baseband spectrum of steps (ii) and (iv) has an upper frequency limit of approximately five megahertz.

8. A method at a receiver for decoding a high definition television signal comprising an encoded standard resolution television signal portion and an encoded high-definition television signal portion with increased horizontal detail consistent with a multiplexed analog components signal format comprising the steps of:
(i) digitally sampling the received multiplexed analog components signal at a first predetermined sampling rate in accordance with a quincunx sampling pattern and preserving the baseband television spectrum at standard television resolution,
(ii) upconverting the sampled output from a first high frequency spectrum portion above an upper limit frequency for standard resolution television to a second high frequency spectrum portion above the first high frequency spectrum portion, resulting in an overall spectrum including high frequency horizontal detail in accordance with a second sampling rate higher than the first sampling rate, and
(iii) scan converting the result of step (ii) for increasing vertical detail.

9. A method of decoding a high definition television signal at a receiver in accordance with claim 8 wherein the digital sampling is performed via a filter less complex than a comparable digital filter applied during encoding for transmission.

10. A method of decoding a high definition television signal at a receiver in accordance with claim 8 further comprising the step of
storing lines of a received high definition television signal prior to upconverting.

11. A method of decoding a high definition television signal at a receiver in accordance with claim 8, the scan conversion step particularly comprising the steps of
storing the upconverted television signal in a field store and doubling the number of vertical lines by interpolation.

12. The method of decoding a high definition television signal at a receiver according to claim 6, wherein, in step (ii), the first high frequency portion is bounded between approximately 5 and 7 megahertz in horizontal resolution and the second high frequency portion resulting in an overall spectrum with improved horizontal detail is bounded between approximately 7 megahertz and 9 megahertz.

13. The method of decoding a high definition television signal at a receiver according to claim 8, wherein in step (i), the digital sampling occurs at a sampling rate of approximately 4 fsc.

14. Apparatus for encoding a high definition television signal with increased horizontal detail for transmission consistent with a multiplexed analog component signal format, the encoded signal being adapted for reception at either a standard resolution or a high definition television receiver, the apparatus comprising
means for orthogonally sampling the high definition television signal at a first sampling rate,
means for filtering the orthogonally sampled television signal to filter diagonal information at frequencies higher than a rectangular baseband spectrum for standard resolution television and to preserve the rectangular baseband spectrum at standard television resolution, and
means for decimating alternate samples on alternate lines leaving a quincunx sample pattern,
for folding a high frequency horizontal detail spectrum component output of the decimating means about a first predetermined frequency above an upper frequency limit for standard resolution television and preserving the rectangular baseband spectrum at standard television resolution by filtering the signal in accordance with a skew-symmetric low-pass frequency response,
the encoded high definition television signal being adapted for reception at either a standard resolution or a high definition television receiver, a standard resolution television receiver comprising a low pass filter for filtering the frequencies above the upper limit frequency for standard resolution television and for passing the preserved baseband spectrum and a high definition television receiver comprising spectrum unfolding means for unfolding the high frequency horizontal detail and scan conversion means for increasing vertical resolution.

15. Encoding apparatus in accordance with claim 14, the filtering means comprising separable horizontal and vertical filters, the horizontal filter being more complex than the vertical filter.

16. Encoding apparatus according to claim 14 further comprising a line store for temporary data storage of alternate orthogonal samples.

17. Apparatus for decoding a high definition television signal comprising an encoded standard resolution television signal and an encoded high-definition television signal portion at a high-definition television receiver consistent with a multiplexed analog component signal format comprising
digital sampling means for sampling the received multiplexed analog component signal at a first sampling rate in accordance with a quincunx sampling pattern and preserving the baseband television spectrum
an upconverter for upconverting the sampled output from a first high frequency spectrum portion above an upper limit frequency to a second high frequency spectrum portion resulting in an overall spectrum including high frequency horizontal detail in accordance with a second sampling rate higher than the first sampling rate, and
scan conversion means for increasing vertical detail of the upconverted signal.

18. Decoding apparatus according to claim 17 the digital filter being less complex than comparable digital filter applied during encoding for transmission.

19. Decoding apparatus according to claim 17 further comprising a line store for storing each line of a received high definition signed prior to upconversion.

20. Decoding apparatus according to claim 17, the scan conversion means comprising
a field store for storing a complete field of the upconverted television signal and
means for doubling the lines of each field by interpolation.

21. Encoder apparatus for encoding a high definition television signal for transmission consistent with a multiplexed analog component format, the encoded signal being adapted for reception at either a standard resolution or a high definition television receiver, the apparatus comprising
  a low-pass pre-filter at approximately nine megahertz,
  a sampling switch circuit for sampling the output of the prefilter at approximately 28 MHz, the sample switch having first and second alternate outputs at approximately 14 MHz each,
  the first output provided to a line store and, via the line store, to a first adder and to a second adder,
  the second output provided to the second adder and, being negated, provided to the first adder,
  the first adder for summing the negated second output with the output of the line store,
  the second adder for summing the second output and the output of the line store,
  a low-pass filter, responsive to the first adder for preserving the rectangular baseband spectrum at standard television resolution and
  a third adder responsive to the low pass filter and the second adder, the third adder providing a signal for transmission having high frequency horizontal detail components folded into the signal spectrum at a frequency band above an upper frequency limit for the rectangular baseband spectrum at standard television resolution,
  the encoded high definition television signal being adapted for reception at either a standard resolution or a high definition television receiver, a standard resolution television receiver comprising a low pass filter for filtering the frequencies above the upper limit frequency for standard resolution television and for passing the preserved baseband spectrum and a high definition television receiver comprising spectrum unfolding means for unfolding the high frequency horizontal detail and scan conversion means for increasing vertical resolution.

22. Decoder apparatus for decoding a high definition television signal at a high-definition television receiver consistent with a multiplexed analog components format comprising
  means for sampling an incoming signal at approximately 14 MHz,
  a first adder responsive to the incoming sampled signal,
  a low pass digital filter at approximately five megahertz responsive to the incoming sampled signal for preserving the baseband spectrum at standard television resolution,
  the first adder summing the incoming signal and the negated output of the low pass digital filter,
  an interpolation circuit for replacing missing samples in the filtered output,
  a line store circuit for storing the output of the first adder,
  an upconverter responsive to the line store circuit and the interpolation circuit for providing an output at approximately 28 megahertz including high frequency horizontal detail and
  scan conversion means responsive to the upconverter for increasing vertical detail.

* * * * *